United States Patent
Haeberer et al.

(10) Patent No.: US 9,494,069 B2
(45) Date of Patent: Nov. 15, 2016

(54) DEVICE FOR METERING A LIQUID REDUCING AGENT

(75) Inventors: Rainer Haeberer, Bretten (DE);
Matthias Horn, Freiberg (DE);
Michael Krause, Trippstadt (DE)

(73) Assignee: Robert Bosch GmbH, Stuttgart (DE)

( * ) Notice: Subject to any disclaimer, the term of this patent is extended or adjusted under 35 U.S.C. 154(b) by 1446 days.

(21) Appl. No.: 12/521,405

(22) PCT Filed: Nov. 15, 2007

(86) PCT No.: PCT/EP2007/062416
§ 371 (c)(1),
(2), (4) Date: Sep. 14, 2010

(87) PCT Pub. No.: WO2008/080691
PCT Pub. Date: Jul. 10, 2008

(65) Prior Publication Data
US 2010/0326546 A1    Dec. 30, 2010

(30) Foreign Application Priority Data

Dec. 28, 2006   (DE) .......................... 10 2006 061 732

(51) Int. Cl.
*F01N 3/00* (2006.01)
*F01N 3/20* (2006.01)

(52) U.S. Cl.
CPC ......... *F01N 3/2066* (2013.01); *F01N 2610/02* (2013.01); *F01N 2610/1406* (2013.01); *F01N 2610/1473* (2013.01); *Y02T 10/24* (2013.01); *Y10T 137/8158* (2015.04); *Y10T 137/8342* (2015.04)

(58) Field of Classification Search
USPC ........................... 60/286, 296, 301; 137/256
See application file for complete search history.

(56) References Cited

U.S. PATENT DOCUMENTS

| | | | |
|---|---|---|---|
| 4,069,841 A * | 1/1978 | Bartlett | 137/565.34 |
| 5,884,475 A * | 3/1999 | Hofmann et al. | 60/274 |
| 6,659,122 B1 * | 12/2003 | Zahdeh et al. | 137/256 |
| 2004/0060286 A1 * | 4/2004 | Huber et al. | 60/286 |
| 2007/0163239 A1 | 7/2007 | Hofmann et al. | |

FOREIGN PATENT DOCUMENTS

| | | |
|---|---|---|
| DE | 4432577 A1 | 3/1996 |
| DE | 10346220 A1 | 4/2005 |
| EP | 0928884 A2 | 7/1999 |

(Continued)

*Primary Examiner* — Thomas Denion
*Assistant Examiner* — Matthew T Largi
(74) *Attorney, Agent, or Firm* — Michael Best & Friedrich LLP

(57) ABSTRACT

The invention relates to a device for metering a liquid reducing agent into an exhaust gas system. The device can be used, in particular, for reducing nitrogen oxides in an exhaust gas. The device includes at least one working container for holding a working quantity of the liquid reducing agent. In addition, the device is provided with at least one metering module, at least one delivery line, and at least one delivery pump. The device also has at least one storage container for holding a storage quantity of the liquid reducing age, preferably a storage quantity that exceeds the working quantity. The storage container is connected to the working container via at least one storage line. The storage line has at least one storage pump disposed therein for circulating liquid reducing agent from the storage container to the working container.

9 Claims, 3 Drawing Sheets

(56) References Cited

FOREIGN PATENT DOCUMENTS

| | | |
|---|---|---|
| EP | 1683967 A1 | 7/2006 |
| WO | 2004047963 A1 | 6/2004 |
| WO | WO 2006064028 A1 * | 6/2006 |
| WO | 2006135803 A2 | 12/2006 |
| WO | WO 2006135803 A2 * | 12/2006 |

* cited by examiner

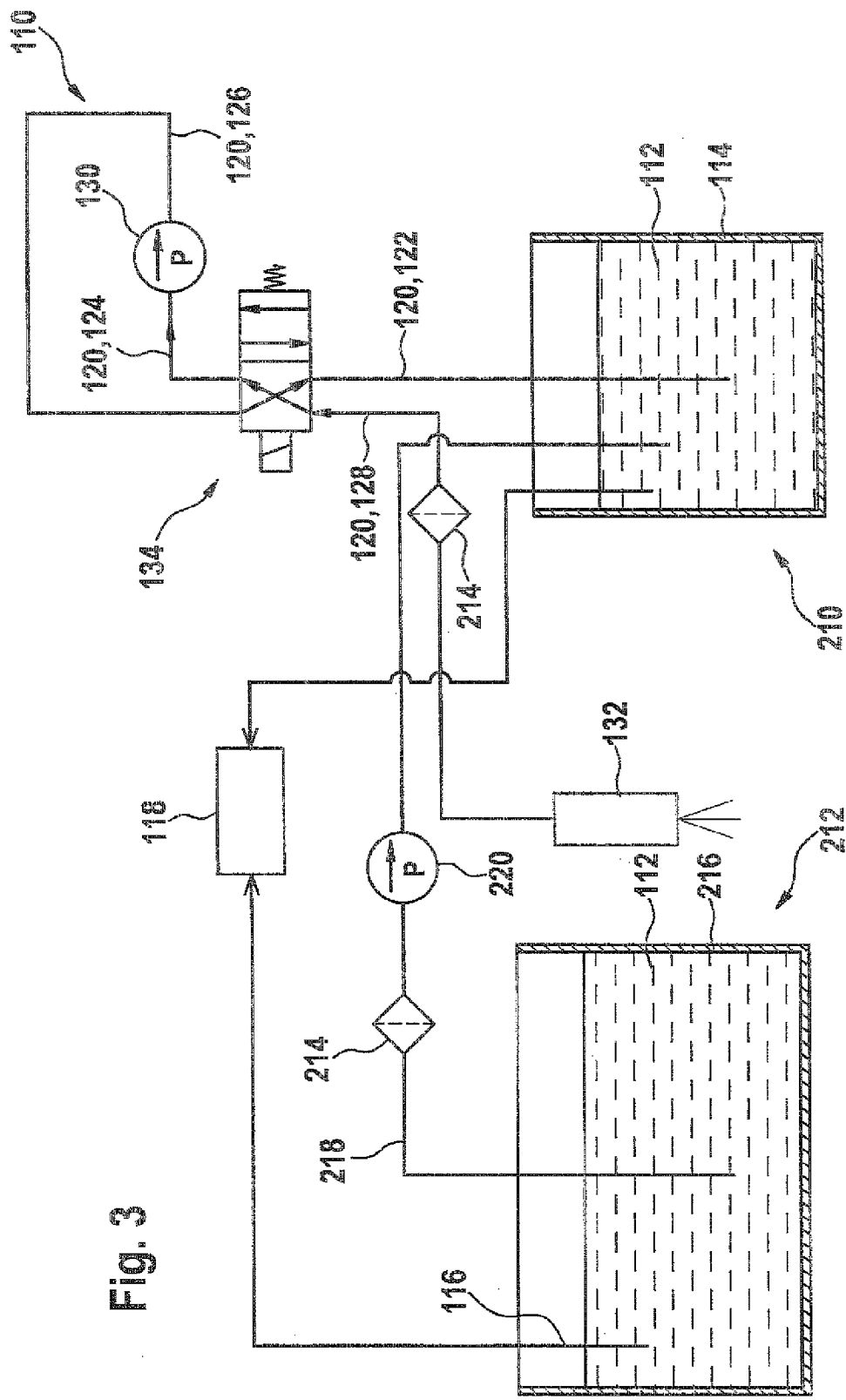

DEVICE FOR METERING A LIQUID REDUCING AGENT

CROSS-REFERENCE TO RELATED APPLICATION

This application is a 35 USC 371 application of PCT/EP 2007/062416 filed on Nov. 15, 2007.

BACKGROUND OF THE INVENTION

1. Field of the Invention

The invention is based on known devices for metering liquid reducing agents or other pollution-reducing liquids in an exhaust system. Such devices are used for instance in the automotive industry, for reducing pollutants in an exhaust gas from an internal combustion engine. The invention furthermore relates to a method for operating the device for metering the liquid reducing agent.

2. Description of the Prior Art

In internal combustion engines, especially diesel-fueled internal combustion engines, because of the more-stringent exhaust gas legislation that will be enacted in the next few years, among other things the proportion of nitrogen oxides in the exhaust gas among will have to be reduced. For reducing the proportion of nitrogen oxide in the exhaust gas, selective catalytic reduction (SCR) is for instance performed, in which he nitrogen oxides are reduced, with the aid of reducing agents, to nitrogen and water. As reducing agents, an aqueous urea solution is used, for example. Still other methods for chemical reduction of pollutants are also known.

In SCR, the reducing agent is typically stored in a tank and is fed from the tank to the metering module via a line. The reducing agent is injected by the metering module, for instance into an exhaust pipe, for instance in the vicinity of a catalytic converter.

One such mixture-dispensing device for introducing a reducing agent into an exhaust system of an internal combustion engine is described in European patent disclosure EP 0 928 884 A2. In it, a urea-water solution is introduced upstream of a catalytic converter by a pump, under pressure and with the addition of compressed air, in order to effect the reduction of nitrogen oxides in the exhaust gas. Besides a reducing agent usage tank, the device shown also has a reducing agent supply tank, from which the reducing agent usage tank can be replenished with urea-water solution via a line equipped with a check valve.

Given the severe ambient conditions under which the systems have to be used in practice, however, the known systems face numerous challenges, some of which so far require great system complexity. One problem, for instance, is that in many eases transferring the reducing agent by pumping entails major effort and expense. For instance, if a pumping device is used not only for metering but also for transferring liquid reducing agent between the storage tank and the working tank by pumping, then this transfer by pumping is possible only either by means of complex control or during after-running of the system, or in other words when the vehicle has been parked. This operation takes several minutes, and in many cases it is very noisy.

Moreover, error recognition in the sense of so-called on-board diagnosis (OBD), which by now is typically demanded, also presents the systems with major challenges. Especially the communication between the storage tank and the working tank must be monitored, which is not always simple when the metering loop and the transfer pumping loop are coupled. Typically, the transfer pumping loop includes valves that can be monitored only with difficulty, so that in the normal operating mode, if such valves leak, overfilling of the storage tank can ensue.

Another challenge is particularly the temperature range in which the systems are typically used. Specifications require operating safety of the systems down to temperatures of approximately −40° C. However, depending on the embodiment of the reducing agent and in particular on the addition of antifreeze agents, the freezing point of the liquid reducing agents (a urea-water solution, for example) is far above that temperature, for instance being approximately −11° C. Accordingly, the systems must be designed to be resistant to ice pressure, which in known systems is usually feasible only by mean of complex provisions for heating the lines. For instance, the connecting line between the storage tank and the working tank must as a rule be embodied in heated form. Valves that are received in that line must as a rule be chosen to be resistant to ice pressure, which is not possible in all cases except at major technological effort and expense.

SUMMARY AND ADVANTAGES OF THE INVENTION

Accordingly, a device for metering a liquid reducing agent into an exhaust system is proposed that avoids the above-described disadvantages of the prior art.

For example, the proposed device can be used in the context of the above-described pollution reduction in SCR processes. Instead of a liquid reducing agent per se, other pollution-reducing fluid media may also be used.

The described device has at least one working tank, for keeping a working quantity of the liquid reducing agent on hand; at least one metering module; at least one supply line; and at least one feed pump. Individual components may also be present in multiple form, such as a plurality of working tanks in the context of a device for mixing fluid media. The feed pump is preferably embodied as a diaphragm pump, since such pumps are in principle resistant to ice pressure. The supply line can be embodied as fully or partially heated.

At least one reversing valve can be received in the supply line, preferably a 4/2-way valve (though other embodiments are also possible) which when there is one feeding direction of the feed pump is designed for at least partly reversing the flow direction through the supply line. In this way, the device can for instance be operated in such a manner that in the normal operating mode, liquid reducing agent is fed by the feed pump from the working tank to the metering module, for instance in order to perform the above-described SCR process. After the normal operating mode is switched off, or in a state in which the device is prepared in a controlled way for a state of repose, the after-running phase of the feed pump can for instance be employed for emptying the supply line into the working tank and for partly or fully ventilating the supply line. In this way, even without complicated and expensive provisions, great resistance to ice pressure is attained.

In addition to the at least one working tank, at least one storage tank is provided for keeping on hand a storage quantity of the liquid reducing agent, which preferably exceeds the maximum working quantity that can be stored in the working tank. Typically, the working tank has a capacity in the range of from 1 to 15 liters, for instance in the range of between 5 and 8 liters and especially preferably approximately 6 liters. The storage tank has a capacity of between 15 liters and 100 liters, preferably in the range of between 20 and 50 liters, and especially preferably approximately 30 liters.

The storage tank communicates with the working tank via at least one storage line, in which a storage pump for transferring liquid reducing agents by pumping is received. As the storage pump, a diaphragm pump is advantageously used, because that pumping principle has high resistance to ice pressure.

Advantageously, the storage line is thus designed as a separate hydraulic connection between the storage tank and the working tank. Hence it is simple to attain monitoring of this hydraulic connection, which preferably has no valves. This advantageous refinement of the invention thus also meets the demands for on-board diagnosis, since it is easy to monitor. The transfer operation by pumping can be done during operation of the device (that is, during metering of the liquid reducing agent). As the storage pump, once again a diaphragm pump can be used, which in principle is resistant to ice pressure. In that case, because of the resistance to ice pressure, the hydraulic line between the storage tank and the working tank can be designed as unheated, since it does not have to be used simultaneously for the metering mode, and since, particularly when the above-described volumes are used, the volume of reducing agent contained in the working tank is sufficient for relatively long-lasting operation, such as operation over a period of freezing temperatures. The transfer operation by pumping can be effected for example via a separate control device, which for instance by means of at least one sensor detects the level of the liquid reducing agent in the working tank. The control device can for example vary the rpm of the storage pump.

BRIEF DESCRIPTION OF THE DRAWINGS

Exemplary embodiments of the invention are described in further detail below in conjunction with the drawings, in which:

FIG. 3 is the device shown in FIG. 2, in the venting mode.

DESCRIPTION OF THE PREFERRED EMBODIMENTS

Figure 1:
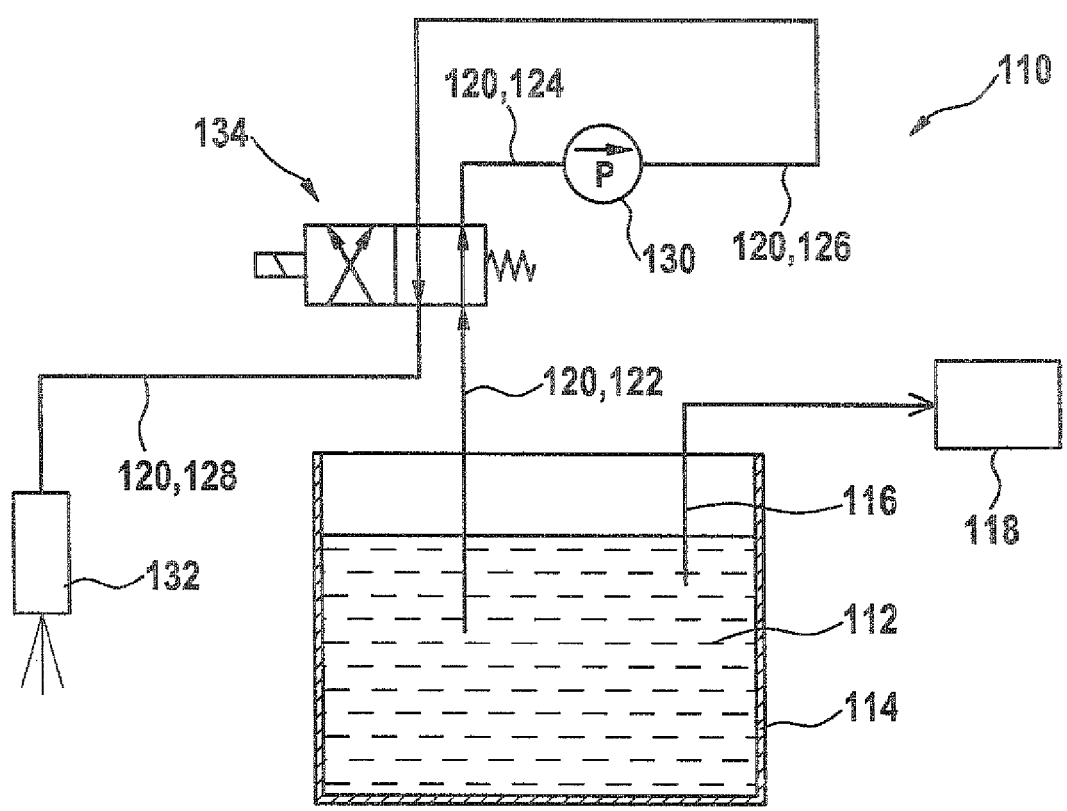
FIG. 1 shows a device for metering a liquid reducing agent, having a working tank and a reversing valve in the form of a 4/2-way valve.

In FIG. 1, one example is shown of a device 110 for metering a liquid reducing agent 112. The liquid reducing agent 112 is received in a working tank 114, which can be equipped for instance with level sensors 116 for monitoring the quantity of liquid in the working tank 114. The data from the level sensors 116 can be forwarded for instance to a control device 118, such as a microcomputer, for example for generating appropriate warning signals when the working tank 114 needs to be refilled.

A supply line 120 is also provided which in this case has the segments 122, 124, 126 and 128. A feed pump 130 received in the supply line feeds liquid reducing agent 112 from the working tank 114 to a metering module 132 through the supply line 120. This metering module 132 may for example be an injection valve for injecting the liquid reducing agent into an exhaust system, for instance a pressure-controlled injection valve. Such injection valves are discussed for instance in EP 0 928 884 A2 and the prior art described in it, so their exact embodiment need not be gone into here. Besides injection of the liquid reducing agent 112 directly, injection with the admixture of additives or gases can also be considered.

A reversing valve 134 is also received in the supply line 120. In the embodiment shown, this reversing valve is designed as a 4/2-way valve and accordingly has four inlets. Each of the above-described segments 122-128 of the supply line 120 communicates with a respective one of the inputs.

In the normal operating mode of the device 110, the first segment 122 communicates with the second segment 124, and the third segment 126 communicates with the fourth segment 128. In this way, via the feed pump 130, liquid reducing agent can be pumped from the working tank 114 to the metering module 132, so as to be injected there into the exhaust gas.

Once the vehicle is parked, the feed pump 130 has an after-running phase (which can optionally also be artificially prolonged, for instance by briefly continuing to run the feed pump 130) can be used purposefully for ventilating the hydraulic system of the device 110 using exhaust gas from the exhaust system. For that purpose, see the illustration in FIG. 3, which shows the reversing valve 134 in the proper switching position for the ventilation. In this switching position, the segment 122 communicates with the segment 126, and the segment 124 communicates with the segment 128. Since the feed pump 130 has not changed its pumping direction, the feeding direction in the segments 128 and 122 are now reversed, so that liquid reducing agent 112 still located in the supply line 120 is pumped back into the working tank 114. Next, for instance via the nozzle openings in the metering module 132, exhaust gas is pumped from the exhaust system (not shown) into the supply line 120, which is thus ventilated with exhaust gas. In this way, the device 110 is prepared for instance for stoppage of the vehicle at low temperatures (for instance, temperatures below −11° C.). This embodiment lends the device 110 and the individual components a high resistance to ice pressure.

Figure 2:
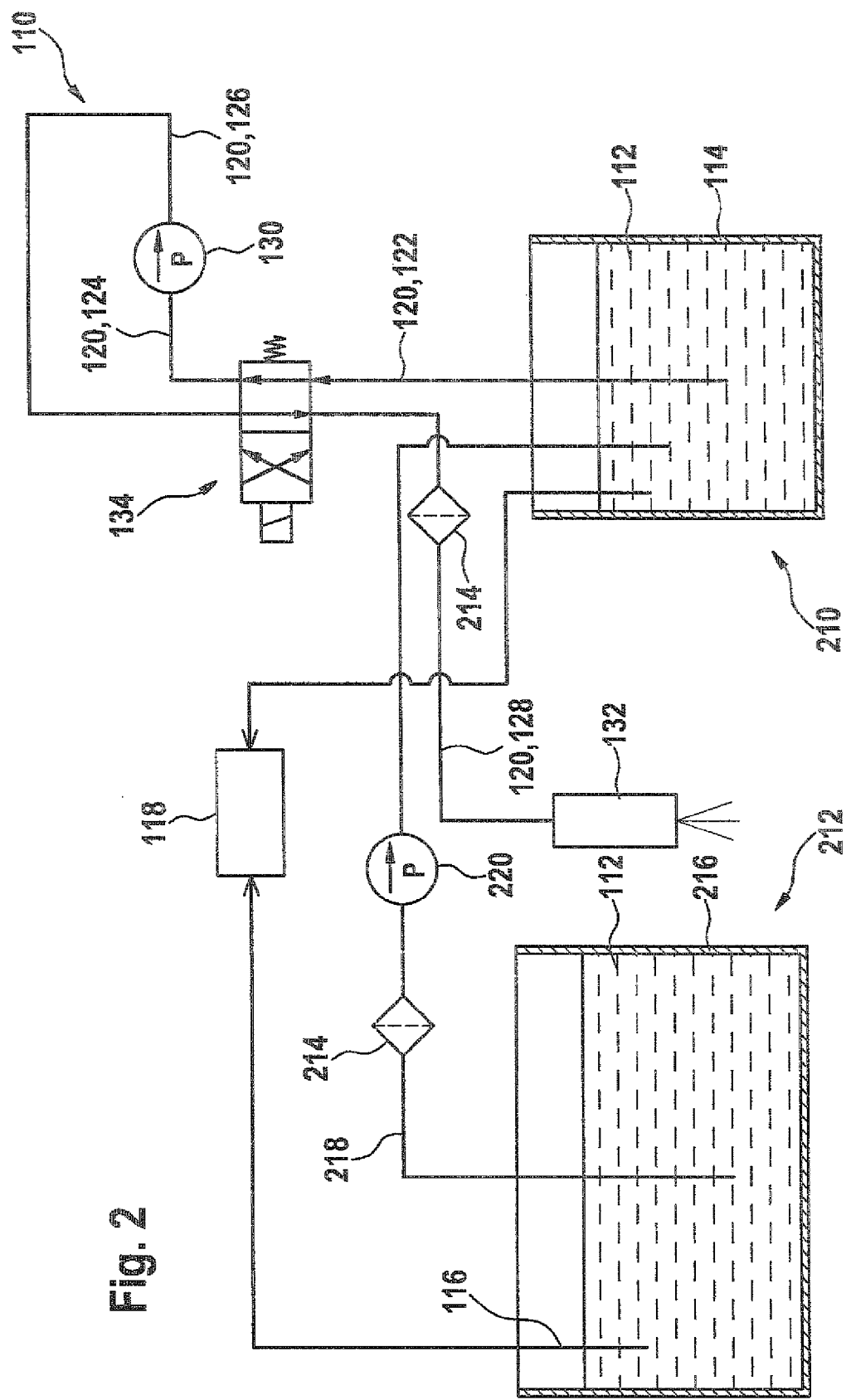
FIG. 2 shows a device according to the invention having a 2-tank system.

In FIGS. 2 and 3, an embodiment of the device 110 of FIG. 1 is shown, developed further according to the invention. However, in contrast to FIG. 1, the device 110 has a working system 210 and a storage system 212. The working system 210 is embodied essentially like the device 110 in Fig. and again has working tank 114, a supply line 120, a feed pump 130, a reversing valve 134, and a metering module 132. Once again, a level sensor 116 and a control device 118 are again provided. Accordingly, for the embodiment of the individual elements, the description of FIG. 1 can largely be referred to. The illustration in FIG. 2 shows the reversing valve 134 in the normal operating mode, that is, in a switching position that corresponds to the switching position of the reversing valve 134 in FIG. 1. By comparison, FIG. 3 shows the reversing valve 134 in the second switching position, or in other words in a ventilation switching position, which has likewise been described above in conjunction with FIG. 1. FIGS. 2 and 3 will therefore be described together below.

Unlike in FIG. 1, the device 110 in FIGS. 2 and 3 also has a filter 214 in the segment 128 of the supply line 120. This filter 214 can essentially serve to prevent stopping up of the metering module 132, for instance from particles or ice crystals. In addition or alternatively, filters may also be provided in further segments. The device 110 shown in FIG. 1 can be designed with corresponding filters 214 as well.

Besides having the working system 210, the device of FIGS. 2 and 3 is further developed, compared to the view in FIG. 1, essentially by the addition of the storage system 212.

This storage system 212 has a storage tank 216. This tank is preferably designed with a larger maximum fill volume than the working tank 114 and serves to keep a storage quantity of the liquid reducing agent 112 on hand. In contrast to the working tank 114, which is preferably designed as a heated working tank for operation at low temperatures, the storage tank 216 can be designed as an unheated tank. In that case, freezing of the liquid reducing agent 112 is intentionally tolerated, since the working tank 114 is preferably designed for supplying the storage quantity kept on hand in it to the motor vehicle during a cold-weather period. Like the working tank 114, the storage tank 216 is equipped with a level sensor 116, which for example likewise furnishes signals to the control device 118, so that warnings can for instance be issued if the level of the storage tank 216 is low.

The storage tank 216 communicates with the working tank 114 via a storage line 218. Via this storage line 218, the working tank 114 can be supplied with liquid reducing agent 112 from the storage tank 216. The storage line 218 thus forms a separate hydraulic path, which does not communicate with the supply line 120 of the working system 210.

To assure the transfer by pumping from the storage tank 216 into the working tank 114 in the normal operating mode of the device 110, a storage pump 220, embodied as a simple pump, is provided in the storage line 218. The term "simple pump" is understood to mean a pump on which only minor demands are made in terms of its service life, such as a pump with a brush motor. As the storage pump 220, once again a diaphragm pump is preferably used, since it is in principle resistant to ice pressure. Once again, a filter 214 that serves to protect the storage pump 220 is received in the storage line 218.

The transfer pumping, that is, the feeding of liquid reducing agent 112 from the storage tank 216 into the working tank 114, is controlled in this example as a function of the fluid level in the working tank 114. Accordingly, the control device 118, which has level signals from the working tank 114, can act on the storage pump 220 accordingly. For example, if the level is low, the storage pump 220 can be switched on or off by the control device 118. Alternatively, continuously variable regulation, for instance of the rpm of the storage pump 220, is also conceivable.

Because of the separate hydraulic paths, in the example shown in FIGS. 2 and 3 the hydraulic system of the working system 210 and the hydraulic system of the storage system 212 are separate from one another. This makes a separate diagnosis of the two systems 210, 212 considerably easier, which can be utilized in an on-board diagnosis. Accordingly, additional sensors can be provided, for instance to monitor leaks. In the variant shown in FIGS. 2 and 3, the transfer pumping noise is also negligible, compared to conventional systems. Since the storage pump 220 is preferably embodied as a diaphragm pump, which is resistant to ice pressure, the storage line can also be embodied as unheated.

The foregoing relates to the preferred exemplary embodiments of the invention, it being understood that other variants and embodiments thereof are possible within the spirit and scope of the invention, the latter being defined by the appended claims.

The invention claimed is:

1. A device for metering a liquid reducing agent into an exhaust system for reducing nitrogen oxides in an exhaust gas, comprising:
    at least one working tank for keeping a working quantity of the liquid reducing agent on hand;
    at least one metering module embodied as an injection valve;
    at least one supply line;
    at least one feed pump disposed in the supply line, which feed pump feeds the liquid reducing agent from the working tank to the metering module;
    at least one storage tank for keeping a storage quantity of the liquid reducing agent on hand, the storage tank communicating with the working tank via at least one storage line, wherein at least one storage pump is disposed in the storage line, which storage pump transfers liquid reducing agent from the storage tank to the working tank by pumping the liquid reducing agent through the storage line, and wherein the storage line forms a separate hydraulic path, which does not communicate with the supply line, and
    at least one reversing valve received in the supply line which at least partially reverses a flow direction through the supply line, wherein the reversing valve is embodied as a 4/2-way valve, with a first inlet of the 4/2-way valve being connected to the working tank, a second inlet of the 4/2-way valve being connected to the metering module, and a third and fourth inlet of the 4/2-way valve each being connected to two different ends of the feed pump.

2. The device as defined by claim 1, wherein the storage pump is embodied as a diaphragm pump.

3. The device as defined by claim 1, further comprising a control device, the control device including at least one sensor for detecting a level of the liquid reducing agent in the working tank, and the control device being arranged for controlling the transfer by pumping of the liquid reducing agent from the storage tank into the working tank as a function of the level in the working tank.

4. The device as defined by claim 2, further comprising a control device, the control device including at least one sensor for detecting a level of the liquid reducing agent in the working tank, and the control device being arranged for controlling the transfer by pumping of the liquid reducing agent from the storage tank into the working tank as a function of the level in the working tank.

5. The device as defined by claim 1, wherein the storage line is valveless.

6. The device as defined by claim 2, wherein the storage line is valveless.

7. The device as defined by claim 3, wherein the storage line is valveless.

8. The device as defined by claim 1, wherein the feed pump is embodied as a diaphragm pump.

9. The device as defined by claim 1, wherein the storage quantity exceeds the working quantity.

* * * * *